Patented May 27, 1924.

1,495,383

UNITED STATES PATENT OFFICE.

CHARLES ANGUS CLEGHORN, OF EAST MOLESEY, ENGLAND.

PUNCTURE-SEALING COMPOUND FOR PNEUMATIC TIRES AND THE LIKE.

No Drawing. Application filed March 11, 1922. Serial No. 543,076.

*To all whom it may concern:*

Be it known that I, CHARLES ANGUS CLEGHORN, a subject of the King of England, residing at East Molesey, Surrey, England, have invented certain new and useful Improvements in Puncture-Sealing Compounds for Pneumatic Tires and the like, of which the following is a specification.

This invention is for improvements in or relating to puncture-sealing compounds for pneumatic tires and the like, and has for one of its objects to provide for the more permanent and generally more efficient sealing of punctures than has heretofore been possible.

It has already been proposed to thin "Turkish birdlime" by heating it and stirring in boiling water in order to enable it to be applied as a coating inside the air tubes of a pneumatic tire or the like. The water was then allowed to evaporate leaving the birdlime in position as a coating adhering to the inner surface of the tube for the purpose of sealing punctures. It has also been proposed to use raw "Turkish birdlime" for the same purpose. Neither of these proposals, however, has proved satisfactory in actual practice. So far as raw "Turkish birdlime" is concerned it is quite impracticable to spread it over the whole of the surface required and to maintain it spread over such surface, since it is too thick, while the treatment of "Turkish birdlime" with boiling water is also unsatisfactory since water at this temperature is detrimental to "Turkish birdlime" and destroys the nature thereof.

According to the primary feature of the present invention there is provided a puncture-sealing compound for pneumatic tires or the like comprising the following materials in substantially the proportions indicated:—

"Turkish birdlime," 200–320 ozs. avoirdupois; methylated spirit, 80–120 fluid ozs.; diatomaceous earth or the like, 120–200 fluid ozs. and water, 80–120 fluid ozs. Any or all of the following substances may also be included, if desired, and in substantially the proportions indicated:—

Borax, 2–3 ozs. avoirdupois; shellac, 6–10 ozs. avoirdupois; perchloride of mercury, .32–.64 ozs. avoirdupois.

One compound which has proved particularly satisfactory for the purpose indicated consists of the following materials in substantially the proportions indicated:—

"Turkish birdlime," 320 ozs. avoirdupois; borax, 3 ozs. avoirdupois; shellac, 6 ozs. avoirdupois; methylated spirit, 120 fluid ozs.; diatomaceous earth, 120 fluid ozs., and water, 120 fluid ozs. This compound also preferably includes .32 ozs. avoirdupois of perchloride of mercury.

The puncture-sealing compound thus made is of the nature of a fluid mass and may be used in a pneumatic tire or the like as described in the specification of the American patent application Serial No. 465,762, from which the present application has been divided. The fluid mass is sufficiently mobile to splash about in the interior of a pneumatic tire during running of the latter and thus it is ensured that any puncture which may be formed in the tire will be immediately reached by the sealing compound.

In making up the puncture-sealing compound the borax, if employed, is dissolved in water at about 180° F. and added gradually to the "Turkish birdlime." The mixture is stirred and when as fluid as it can thus be made is cooled to 150° F. The methylated spirit, with the shellac, if used, dissolved in it, is then added gradually, the mixture being continuously stirred. The perchloride of mercury, if used, is then added, it being first dissolved in water. Finally the diatomaceous earth is thoroughly stirred into the mixture. This is the preferred method of preparing the puncture-sealing compound but it may be varied in certain respects if thought desirable. The proportions of the various substances used may also be varied to a certain extent but it is thought that the best results will be obtained by adhering to the ranges hereinbefore specified for the various ingredients.

It cannot be definitely established how the punctures are actually sealed but it is thought that the diatomaceous earth with a little shellac, when the latter is used, performs this function, these substances being themselves insoluble in water and being made resilient and flexible to a certain extent by the "Turkish birdlime." The action is secured by the co-operation of several ingredients and the same results cannot be obtained by "Turkish birdlime" alone nor by shellac and diatomaceous earth alone or together. Possibly a new substance is formed which partakes of the nature of cement but is elastic and flexible. The methylated spirit, in addition to dissolving the shellac, also changes or assists to dissolve the "Turkish birdlime." It should not, however, be added too quickly. The borax acts to a certain extent as a preservative and tends to thin the "Turkish birdlime." The perchloride of mercury is useful as a preservative.

The nature of "Turkish birdlime" is indicated in the aforesaid Patent No. 1,356,267. Probably the commercial product includes materials other than the pulp of the fruits of the trees in question. This pulp, however, is the essential constituent of the "Turkish birdlime" and may, if desired, be incorporated in the puncture-sealing compound according to the present invention, without any of the other materials which may be commonly included in the commercial substance known as "Turkish birdlime". It will be understood, therefore, that where the term "Turkish birdlime" is used in this specification it is intended to include either the commercial product known as "Turkish birdlime" or the pure pulp of the fruits in question.

While the invention is not limited in its application to pneumatic tires, it will be found to be exceedingly efficient when used in connection with them. The puncture-sealing compound will last indefinitely in the interior of the tire and will continue to work efficiently and well throughout the life of the tire. Punctures will be sealed up permanently and tightly and practically instantaneously while the presence of the compound will not interfere with the resilience of the tire.

What I claim as my invention and desire to secure by Letters Patent is—

1. A puncture-sealing compound for pneumatic tires and the like, comprising the following materials in substantially the proportions indicated:—"Turkish birdlime," 200–320 ozs. avoirdupois; methylated spirit, 80–120 fluid ozs; diatomaceous earth or the like, 120–200 fluid ozs., and water, 80–120 fluid ozs.

2. A puncture-sealing compound for pneumatic tires and the like, comprising the following materials in substantially the proportions indicated:—"Turkish birdlime," 200–320 ozs. avoirdupois; methylated spirit, 80–120 fluid ozs.; diatomaceous earth or the like, 120–200 fluid ozs.; borax, 2–3 ozs. avoirdupois, and water, 80–120 fluid ozs.

3. A puncture-sealing compound for pneumatic tires and the like, comprising the following materials in substantially the proportions indicated:—"Turkish birdlime," 200–320 ozs. avoirdupois; methylated spirit, 80–120 fluid ozs.; diatomaceous earth or the like, 120–200 fluid ozs.; borax, 2–3 ozs. avoirdupois; shellac, 6–10 ozs. avoirdupois, and water, 80–120 fluid ozs.

4. A puncture-sealing compound for pneumatic tires and the like, comprising the following materials in substantially the proportions indicated:—"Turkish birdlime," 200–320 ozs. avoirdupois; methylated spirit, 80–120 fluid ozs.; diatomaceous earth or the like, 120–200 fluid ozs.; borax, 2–3 ozs. avoirdupois; shellac, 6–10 ozs. avoirdupois; perchloride of mercury, .32–.64 ozs. avoirdupois, and water, 80–120 fluid ozs.

5. A puncture-sealing compound for pneumatic tires and the like, comprising the following materials in substantially the proportions indicated:—"Turkish birdlime," 320 ozs. avoirdupois; borax, 3 ozs. avoirdupois; shellac, 6 ozs, avoirdupois; methylated spirit, 120 fluid ozs.; diatomaceous earth, 120 fluid ozs., and water 120 fluid ozs.

6. A puncture-sealing compound for pneumatic tires and the like, comprising the following materials in substantially the proportions indicated:—"Turkish birdlime," 320 ozs. avoirdupois; borax, 3 ozs. avoirdupois; shellac, 6 ozs. avoirdupois; methylated spirit, 120 fluid ozs.; diatomaceous earth, 120 fluid ozs.; perchloride of mercury, .32 ozs. avoirdupois, and water, 120 fluid ozs.

In testimony whereof I affix my signature.

CHARLES ANGUS CLEGHORN.